United States Patent [19]
Abens

[11] 3,918,988
[45] Nov. 11, 1975

[54] ELECTRIC CURRENT-PRODUCING CELLS
[75] Inventor: Sandors G. Abens, Philadelphia, Pa.
[73] Assignee: Honeywell Inc., Minneapolis, Minn.
[22] Filed: Jan. 19, 1972
[21] Appl. No.: 219,185

Related U.S. Application Data
[63] Continuation of Ser. No. 808,651, March 19, 1969, abandoned.

[52] U.S. Cl. ............ 136/6 LN; 136/100 R; 136/155
[51] Int. Cl.² .......................................... H01M 39/04
[58] Field of Search ............. 136/83, 100, 154–155, 136/90, 3, 6 LN, 153, 137

[56] References Cited
UNITED STATES PATENTS
3,380,855  4/1968  Mahy et al. .......................... 136/100
3,415,687  12/1968  Methlie ............................... 136/100

Primary Examiner—Anthony Skapars
Attorney, Agent, or Firm—Charles J. Ungemach; Albin Medved; John S. Munday

[57] ABSTRACT

An improved current-producing cell system wherein the electrolyte comprises a solution of lithium-hexofluoroarsenate in methyl formate. The novel cell consists essentially of a lithium metal anode, a cathode, and an electrolyte solution of lithium-hexofluoroarsenate in methyl formate.

13 Claims, No Drawings

ELECTRIC CURRENT-PRODUCING CELLS

This is a continuation of application Ser. No. 808,651, filed Mar. 19, 1969, now abandoned.

BACKGROUND OF THE INVENTION

1. Field of the Invention

The present invention pertains to current-producing cells and to method of generating electric current using the same. The cell may or may not be of the deferred action type depending upon whether or not one or more of the elements is held out of contact from the others until time of activation. Two or more cells may be associated and connected together electrically to form a battery.

2. Description of the Prior Art

Methyl formate has been previously disclosed as a useful solvent in an electric current-producing cell using a lithium metal anode. U.S. Pat. No. 3,380,855 shows a cell wherein the electrolyte comprises lithium perchlorate dissolved in methyl formate.

SUMMARY OF THE INVENTION

An object of the present invention is to provide an improved electric current-producing cell capable of operation over a wide range of temperature and having an ability to provide high rate of electric energy output. Lithium metal anode is used because of its high activity. If reduced activity is desired, the lithium may be associated with another metal, such as an alloy form with a less active metal. Lithium may also be in contact with another metal structure, such as nickel or silver screen, which serves as the anode conductor.

Even in short life batteries, stability of lithium in the electrolyte is of major importance. Decomposition products could form blocking films at the anode and cause cells to develop high operating pressures.

In accordance with the present invention, the electrolyte is comprised essentially of lithium-hexofluoroarsenate dissolved in methyl formate. In laboratory tests, lithium exhibited remarkable stability with this electrolyte and the pressures developed were within the acceptable range.

The conductivity of lithium-hexofluoroarsenate dissolved in methyl formate was tested at various concentrations. At room temperature (27°C. ±1°C.) the following measurements were observed.

| Molar Concentration LiAsF$_6$/MF | Specific Conductance mmho/cm |
| --- | --- |
| 1 M | 29.7 |
| 2 M | 40.2 |
| 3 M | 33.5 |
| Saturation (3M >4M) | 29.5 |

The cathode is constructed of an electrochemically reducible material having a potential at least about one volt below that of the anode. Suitable cathode materials (depolarizers) are salts of metals like silver, mercury, copper, lead, nickel, and cobalt. A number of cathode materials, particularly useful in combination with the above electrolyte and lithium anode, have been discovered. Examples of these are silver chloride, nickel fluoride, copper chloride, and copper bromide.

Of particular interest are cathodes consisting essentially of one or a mixture of several group IV B, V, VI B, and VII B metal oxides. Advantage of these is that the cathode is relatively insoluble and chemically inert in the lithium-hexofluoroarsenate — methyl formate electrolyte, but is easily reduced electrochemically at potentials 2.5 to 3.5 volts positive to the lithium electrode. This property of the cathode allows construction of cells having a particularly long wet life combined with high power density discharge capability. A particularly useful cell comprises a cathode composition including vanadium pentoxide ($V_2O_5$), a lithium metal anode, and lithium-hexofluoroarsenate — methyl formate electrolyte.

A finely divided conductive material, such as carbon black or graphite, may be mixed with the cathode material to render the mixture more conductive. Other materials such as paper fibers, cellulose acetate, and polystyrene may be incorporated into the cathode structure to act as binders.

Carbon, silver, copper, platinum, nickel or any other inert conductive material may be used as a cathode conductor, in intimate contact with the cathode composition.

Following are specific examples of electric cells constructed and operated successfully in laboratory. The invention will be better understood from the consideration of these examples, but it is not intended that they limit the scope of the invention in any way.

EXAMPLE 1

The anode is constructed by pressing a lithium metal sheet 0.015 inches thick, into an expanded silver mesh. The sheet is then cut into 2 × 1.5 inches rectangles and wire leads are attached.

The cathode is made from a mixture of 24.3 parts of $MnO_2$, 2.44 parts of carbon and 0.24 part polystyrene. The mixture is formed into a paste by adding xylene and applied to an expanded silver support, whereupon xylene is removed by vacuum drying. The cathode is shaped into 2 × 1.5 inches rectangles and wire leads are attached.

A cell is constructed having an anode and a cathode and a glass filter mat, serving as a separator, positioned between the plates. The composite structure is enclosed in a polyethylene case.

An electrolyte solution is prepared by dissolving lithium-hexofluoroarsenate in methyl formate in a ratio of one mole of lithium-hexofluoroarsenate per liter of methyl formate. The cell is activated by injecting a sufficient quantity of the electrolyte solution into the cell structure to place the electrodes into an electrolytic contact with each other.

An electric load is then connected to the cell and current withdrawn at 0.42 mA/cm$^2$ at 35° C. Under these conditions the cell operated for 159 hours to a final voltage of 2.8V. It operated for 195 hours to a final voltage of 2.0V.

EXAMPLE 2

A cell is constructed in the manner of Example 1, except that the cathode composition includes a quantity of LiAsF$_6$. The cathode comprises 19 parts $MnO_2$, 5.3 parts LiAsF$_6$, 2.44 parts carbon and 0.25 part polystyrene.

In the laboratory, the cell operated to a final voltage 2.5V at an average voltage of 2.8V for 109 hours and to a final voltage of 2.0V for 142 hours.

EXAMPLE 3

A cell is constructed as in Example 1, except that silver chloride is substituted for the $MnO_2$ as the depolarizing material. The cathode composition includes 24.3 parts AgCl, 2.44 parts carbon and 0.25 part polystyrene. Upon activation, the cell built in this manner operated 200 hours to a final voltage of 2.5V at an average voltage of 2.6V.

EXAMPLE 4

A cell is constructed as in Example 1, except that $NiF_2$ is used as the depolarizing agent. A cathode pad is made, in the manner explained in Example 1, from a mixture of 50 parts $NiF_2$, 10 parts carbon and one part polystyrene. The cell is connected to a 50 ohm load and activated by addition of the electrolyte.

A cell according to this example was built in the laboratory, giving the following results. 0.026 amperehours were withdrawn at a rate of 1.29 $mA/cm^2$ and an average voltage of 2.58V. The load was then changed to 100 ohm's and the cell was operated until the potential dropped below 2.0V. Under the 100 ohm load, a current rate of 0.60 $mA/cm^2$ was achieved at an average voltage of 2.40V. The cell life to a 2.0 final voltage was 10.1 hours, yielding a total output of 0.268 amperehours.

EXAMPLE 5

A cell is constructed having a lithium metal anode as in Example 1, but having a cathode with $K_2S_2O_8$ as the depolarizing material. The electrolyte is a solution of two moles of lithium-hexofluoroarsenate in one liter of methyl formate. The electrodes are connected extensively through a 50 ohm load and the cell is operated at a temperature of −54°C. An initial open circuit voltage of 3.20 volts is achieved and the current is withdrawn at 1.21 $mA/cm^2$ for 0.3 hours to a final voltage of 2.0 volts.

EXAMPLE 6

A cell is constructed as in Example 5, but operated at −29°C. An initial open circuit voltage of 3.55 volts is achieved. The current is withdrawn at 1.31 $mA/cm^2$ for .8 hours to a final voltage of 2.0V.

EXAMPLE 7

A cell is constructed, as in Example 1, but having a cathode composition comprising 100 parts copper bromide, 20 parts carbon and one part polystyrene. The electrolyte is a two mole concentration of lithium-hexofluoroarsenate. At 23°C. the cell, connected to a five ohm load, delivered 12 $mA/cm^2$ of working electrode area at an average voltage of 2.4 volts for 0.55 hour to a final voltage of 2.0 volts.

EXAMPLE 8

A cell assembled as in Example 7, but operated at −29°C. delivered 12 $mA/cm^2$ at an average voltage of 2.4 volts for 0.28 hour to a final voltage of 2.0V.

EXAMPLE 9

A cell is constructed as in Example 7 but operated at −54°C. and connected to a 25 ohm load. It delivered 2.7 $mA/cm^2$ for 1.7 hours at an average voltage of 2.66V to a final voltage of 2.0V.

EXAMPLE 10

A cell is constructed and operated as in Example 9, except that the electrolyte is a one mole solution of lithium-hexofluoroarsenate in methyl formate. Operating into a 25 ohm load and at −54°C., the cell delivered 2.4 $mA/cm^2$ for 2.4 hours at an average voltage of 2.44V to a final voltage of 2.0V.

EXAMPLE 11

A cell is constructed having a lithium anode as in Example 1. The cathode composition is made of copper chloride as the depolarizing material and 15 percent carbon. The plates, having a working area of 40 $cm^2$ are separated by a woven glass mat and the cell is activated with an electrolyte solution prepared by dissolving two moles of lithium-hexofluoroarsenate in methyl formate. The plates are connected externally to a 50 ohm load and the cell is operated at −40°C. Under these conditions a cell operated for six hours to a final voltage of 2V.

EXAMPLE 12

A particularly useful cell comprises a cathode consisting of 90% vanadium pentoxide ($V_2O_5$), 9% carbon black, and 1% polystyrene, a two molar solution of lithium-hexofluoroarsenate — methyl formate electrolyte, and a lithium metal anode. Several cells of this type having a single anode, a single cathode, and a geometric working electrode area of about 6 $cm^2$ were built and tested. The open circuit potential of the cells was 3.5 volts. At a temperature of 35°C., the load potential at 2.5 mA was 3.4 volts, and the cell could be discharged for 100 hours at this current. At a temperature of −54°C., the load potential was 2.8 volts at 6 mA for several minutes, and then decreased gradually. The sealed cells were stored for two weeks at a temperature of +74°C., after which the load potential at 2.5 mA was 3.2 volts.

EXAMPLES 13–16

Cells are constructed as in Example 12, having a lithium metal anode, vanadium pentoxide cathode and a two molar solution of lithium-hexofluoroarsenate — methyl formate electrolyte. The cells are operated at temperatures and loads indicated in the table below to a final voltage (V.F.) of 2.0V.

| Cell | Temp. °C. | Load ohms | Hours to V.F. | Average Voltage | Average Current $mA/cm^2$ |
|---|---|---|---|---|---|
| 13 | −54 | 25 | 2.5 | 2.25 | 2.25 |
| 14 | −54 | 100 | 33.2 | 2.12 | .53 |
| 15 | 25 | 25 | 6.6 | 2.12 | 2.12 |
| 16 | 25 | 100 | 33.0 | 2.05 | .51 |

Many other cells can be constructed in accordance with the present invention, by selecting other materials as cathodes. The above examples were set out to illustrate some of the preferred embodiments of the invention, demonstrating the effectiveness of lithium-hexofluoroarsenate in methyl formate in producing useful electric current-generating cells wherein lithium forms an essential element of the anode electrode.

What is claimed is:

1. An electric current-producing cell comprising a lithium metal anode, an electrolyte consisting essentially of methyl formate and lithium-hexofluoroarsenate dissolved therein in an amount capable of rendering said electrolyte electrically conductive, and a depolarizing cathode, at least a major constituent of which is a metal salt selected from a group consisting of silver chloride, nickel fluoride, copper chloride, copper bromide, and oxides of group IV B, V, VI B and VII B metals.

2. A cell of claim 1, wherein the concentration of lithium-hexofluoroarsenate in said electrolyte is at least one mole per liter of methyl formate.

3. A cell of claim 1 wherein the electrolyte is a two molar solution of lithium-hexofluoroarsenate in methyl formate.

4. An electric current-producing cell having a lithium metal anode, an electrolyte consisting essentially of methyl formate and lithium-hexofluoroarsenate dissolved therein in an amount capable of rendering said electrolyte electrically conductive, and a cathode at least a major constituent of which is an oxide of a metal selected from groups IV B, V, VI B, and VII B.

5. A cell of claim 4, wherein the concentration of lithium-hexofluoroarsenate in said electrolyte is at least one mole per liter of methyl formate.

6. A cell of claim 4 wherein the electrolyte is a two molar solution of lithium-hexofluoroarsenate in methyl formate.

7. An electric current-producing cell comprising a lithium metal anode, an electrolyte consisting essentially of methyl formate and lithium-hexofluoroarsenate dissolved therein, and a depolarizing cathode, at least a major constituent of which is a metal salt selected from a group consisting of silver chloride, nickel fluoride, copper chloride, copper bromide, manganese dioxide and vanadium pentoxide.

8. A cell of claim 7, wherein the concentration of lithium-hexofluoroarsenate in said electrolyte is at least one mole per liter of methyl formate.

9. A cell of claim 7 wherein the electrolyte is a two molar solution of lithium-hexofluoroarsenate in methyl formate.

10. An electric current-producing cell comprising a lithium metal anode, an electrolyte consisting essentially of methyl formate and lithium-hexofluoroarsenate dissolved therein, and a depolarizing cathode at least a major constituent of which is vanadium pentoxide.

11. A cell of claim 10 wherein the cathode consists essentially of 90% vanadium pentoxide, 9% carbon black and 1% polystyrene.

12. A cell of claim 11 wherein the concentration of lithium-hexofluoroarsenate in said electrolyte is at least one mole per liter of methyl formate.

13. A cell of claim 11 wherein the electrolyte is a two molar solution of lithium-hexofluoroarsenate in methyl formate.

* * * * *